(12) United States Patent
Raj et al.

(10) Patent No.: US 6,388,372 B2
(45) Date of Patent: May 14, 2002

(54) DISPLAY SCREEN

(75) Inventors: Kannan Raj, Chandler; Lawrence A. Booth, Jr., Phoenix, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/924,801

(22) Filed: Aug. 8, 2001

Related U.S. Application Data

(62) Division of application No. 09/318,501, filed on May 25, 1999, now Pat. No. 6,326,723.

(51) Int. Cl.⁷ .......................... H01J 29/10; G02C 26/00
(52) U.S. Cl. .................. 313/461; 313/462; 313/471; 359/290; 359/291; 359/614; 359/609; 359/15; 359/245; 359/237
(58) Field of Search ................... 313/461, 462, 313/471, 470, 472; 359/290, 296, 291, 601, 605, 606, 608, 613, 614, 609, 15, 443, 449, 452, 455, 459

(56) References Cited

U.S. PATENT DOCUMENTS

| | | | | |
|---|---|---|---|---|
| 4,252,865 A | * | 2/1981 | Gilbert et al. | 428/611 |
| 4,634,223 A | * | 1/1987 | Ishi | 350/286 X |
| 4,802,737 A | * | 2/1989 | Denton | 350/166 |
| 4,944,986 A | * | 7/1990 | Zuel | 428/156 |
| 5,142,385 A | * | 8/1992 | Anderson et al. | 369/10 |
| 5,212,596 A | * | 5/1993 | Andrus | 313/614 |
| 5,817,396 A | * | 10/1998 | Perlo et al. | 428/141 |
| 5,861,990 A | * | 1/1999 | Tedesco | 313/608 |

\* cited by examiner

Primary Examiner—Ashok Patel
(74) Attorney, Agent, or Firm—Trop, Pruner & Hu, P.C.

(57) ABSTRACT

A display screen may be formed with a moth-eye like array of elements of sufficiently small size to reduce glare from ambient light while passing outbound image light substantially unaffected. The screen may be used in direct view and projection displays.

10 Claims, 1 Drawing Sheet

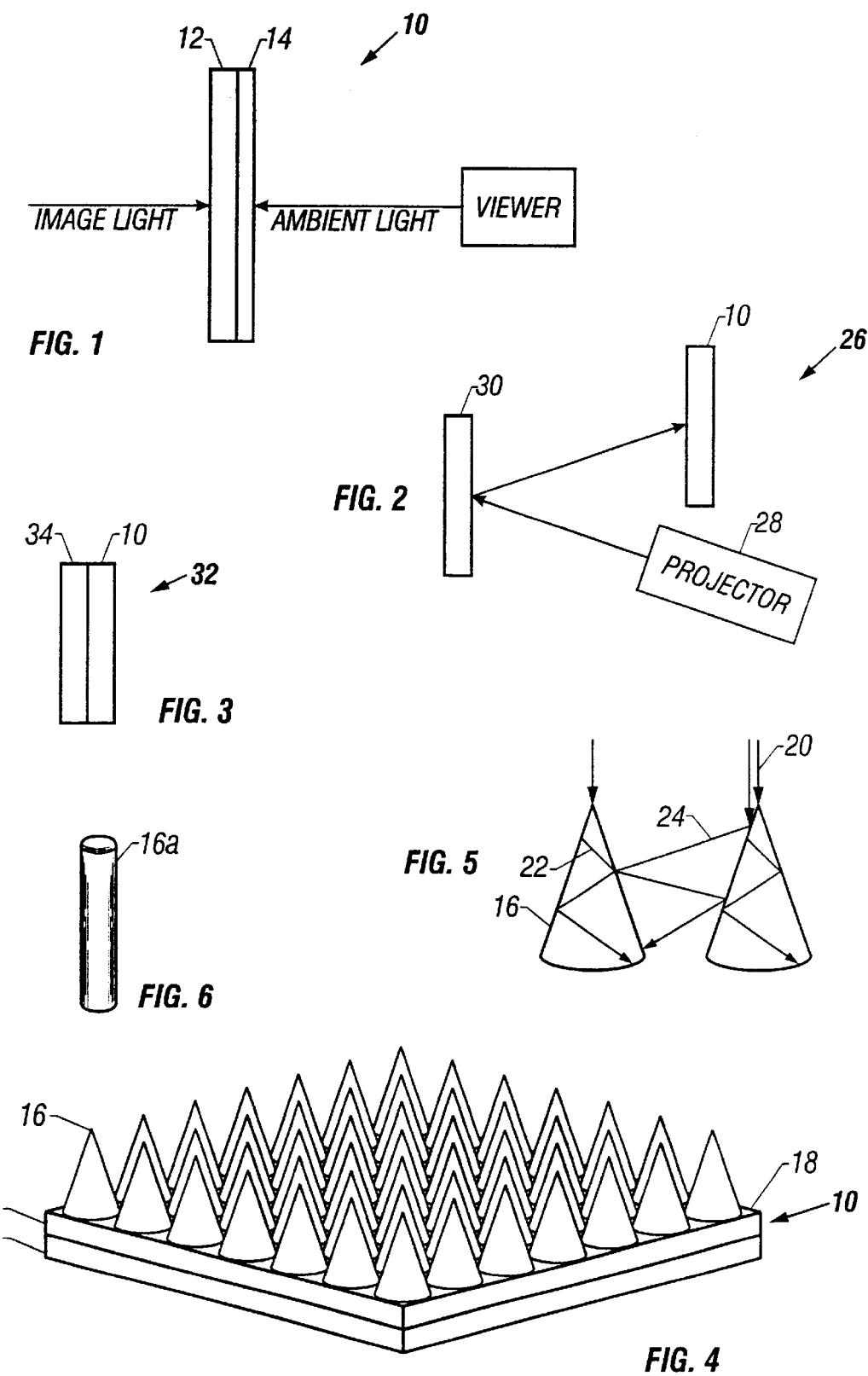

DISPLAY SCREEN

This is a divisional of prior application Ser. No. 09/318, 501 filed May 25, 1999, now U.S. Pat. 6,326,723.

BACKGROUND

This invention relates generally to screens for displays including screens over direct view displays and screens upon which an image is projected in projection displays.

Displays are commonly used to show an image which has been electronically generated. Displays are found in televisions receivers, computer monitors and projection display systems, processor-based appliances, toys and games and in a variety of hand-held devices including personal digital assistants, telephones, and the like. These displays may generally be divided into direct view displays, in which an image is viewed directly by the user, and projection displays, in which the image may be projected onto a larger surface so that a larger image results which is more readily viewable by one or more viewers. Projection displays may include those that use reflective techniques and those that use transmissive techniques for generating the projected image. In each case, a screen ultimately provides the image for view by the user.

Display screens are subject to a number of shortcomings. Commonly, the display screen may produce glare as a result of the reflection of ambient light from flare and ghosting. In addition, displays may be subject to graininess wherein the particles forming the display screen or the imaging device itself create pixel boundaries which are readily viewable by the user. Some displays are subject to a defect called pixellation where the graininess of the imaging device is visible to the user.

In addition, some displays, including those that are using coherent light sources, may be more susceptible to interference effects resulting in speckle. Speckle is a plurality of point light images which come from the display and may move when the user moves with respect to the display. To some degree, speckle artifacts may be enhanced by the graininess of the imaging device or the display screen.

Some displays may have limited fields of view so that the viewing angle may be restricted. If the user moves beyond the viewing angle of the display, contrast reversal may result.

It is known to use a diffuser over display screens to improve the viewing angle and to overcome the graininess of the image that is viewed. For example, some display screens use a diffuser in combination with a Fresnel lens to overcome these effects. However, such systems do little to overcome the effects of ambient light on the display and the glare that may result. In addition, many of the techniques for overcoming graininess and speckle are less than completely effective.

More recently, rear projection television screens have been based on a laminate structure combining lenticular and Fresnel optical elements that may achieve increased brightness uniformity, increased image brightness in a preferred viewing cone and reduced glare. A Fresnel lens forms an image of the projection lens aperture in the middle of the viewing area which is typically a small region. This small region is enlarged by adding a weak diffuser which expands the viewing area along the vertical direction. A lenticular array stretches the viewing area along the horizontal dimension. A holographic diffuser can replace a conventional diffuser and a lenticular array.

While existing designs may provide adequate gain, brightness and contrast, they may not provide adequate ambient light rejection due to back reflection from the screen. In some cases, speckle may be a problem due to the finite grain size on the diffusing screen, which may be a particularly severe problem under coherent illumination.

Thus, there is a continuing need for techniques which provide adequate gain, brightness and contrast while improving the ambient light rejection and, in some applications, reducing speckle.

SUMMARY

In accordance with one aspect of the present invention, a display screen includes a support structure. A moth-eye pattern of light absorbing elements is formed on the support structure.

BRIEF DESCRIPTION OF THE DRAWINGS

FIG. 1 is a schematic depiction of one embodiment in accordance with the present invention;

FIG. 2 is a schematic depiction of a projection display in accordance with one embodiment of the present invention;

FIG. 3 is a schematic depiction of a direct view display in accordance with one embodiment of the present invention;

FIG. 4 is a perspective view of the embodiment shown in FIG. 1;

FIG. 5 is an enlarged perspective view of a portion of the display screen shown in FIG. 2 showing how ambient light is rejected by the display screen in one embodiment of the present invention; and FIG. 6 is an enlarged perspective view of moth-eye like element useful in another embodiment of the present invention.

DETAILED DESCRIPTION

Referring to FIG. 1, a display screen 10, receiving image light to be displayed through or on the screen, rejects ambient light coming from the viewer's side of the screen 10. In this way, the screen can provide adequate gain, brightness and contrast while improving ambient light rejection and reducing speckle, at least in cases where coherent illumination is involved. The viewer, indicated in FIG. 1, expects to see a display with good gain, brightness and contrast. At the same time the viewer prefers not to have ambient light reflected back as glare into the viewer's line of sight.

The display screen 10 may be a display screen for a projection view display 26, as shown in FIG. 2. In such case, a projector 28 projects light that is viewed on the screen 10. In an embodiment with a rear projection system, a mirror 30 may be used to reflect an image through the screen 10 to a viewer on the outside. In some cases, the image light may be formed by a reflective optic system so that the viewer views the image through the display screen 10. In other cases, a transmissive optical system may be utilized for example for a front projection display.

The display screen 10 may be a direct view display 32 screen, as indicated in FIG. 3, in which case the image light may be formed by an image forming device 34 such as a spatial light modulator, that is relatively close to the display screen 10 itself.

The screen 10, in one embodiment, includes a Fresnel lens 12 and broadband holographic phase plate 14, shown in FIG. 1. Which the lens 12 and plate 14 are shown in a face to face orientation the lens 12 and plate 14 may be separated as well. The phase plate 14 may perform the role of a diffuser which controls brightness, contrast, gain and the resolution of the screen. In addition, the holographic phase plate rejects ambient light. It may provide for both horizontal spread and vertical spread.

As shown in FIG. 4, the holographic phase plate may have a plurality of light absorbing elements 16 formed on a substrate 18. The substrate 18 may include the layers 12 and 14 which form the screen 10. The elements 16 may be light transmissive in one embodiment of the present invention. The effect of the light absorbing elements 16, best shown in FIG. 5, is to cause a plurality of labyrinthine surface reflections either internally of the elements 16 as indicated at 22 or between adjacent elements as indicated at 24. By virtue of the moth-eye like structures 16, light trapping reduces back reflections or glare.

Since the graininess of the display may be overcome, the effects of pixellation and limited viewing angle may also be improved with the screen 10. Reducing graininess may also reduce speckle by increasing the interaction length (or optical path length) of the screen.

The elements 16 may be fabricated on planarized surfaces using a technique called holographic lithography. See U.S. Pat. No. 5,142,385, assigned to Massachusetts Institute of Technology; N.P. Economous, et al., "A Simple Technique for Modifying the Profile Reset Exposed by Holographic Lithography," J. Vac. Sci. Tec. 19, 1234 (1981). Holographic Lithography Systems, Inc. of Bedford, Massachusetts has produced such moth-eye structures using a maskless holographic technique which allows patterning by the interference. Feature sizes as small as 90 nanometers may be formed over large areas. Using this technique, moth-eye like surface relief array structures may be formed of an array of microscopic protrusions.

Holographic lithography is a maskless holographic technique which allows the patterning, by interference, of microscopic feature sizes. Holographic lithography involves a periodic or quasi periodic pattern exposed in a photosensitive film by overlapping two beams from a laser or other coherent source.

In one particular implementation of holographic lithography, termed "achromatic holographic lithography," gratings are used to split and recombine the beams (see E. Anderson, K. Komatsu and H. I. Smith, "Achromatic Holographic Lithography in the Deep UV," J. Vac. Sci, Tech. B6, 216 (1988)). As a result, the source need not have a high degree of temporal coherence (i.e., narrow bandwidth) or spatial coherence commonly seen in laser sources. The minimum period, p, (i.e., center-to-center distance between adjacent lines) obtainable in holographic lithography is given by $$p = \lambda/2 \sin\theta$$

where $\lambda$ is the wavelength of the exposed radiation and $\theta$ is half the angle between the intersecting beams. This angle may be as large as 62 degrees, in which case $p = 0.57\lambda$.

If two beams from a single coherent source, such as a laser overlap, and if environmental vibrations are sufficiently low that the beams do not move relative to one another by more than about p/2, a recognizable diffraction grating may be recorded in a photographic resist film. In the region of overlap of the two beams there is an optical standing wave whose spatial period is given by the above equation. The standing wave includes sinusoidally alternating dark and light fringes (i.e., regions of high and low irradiance). The interference pattern is recorded in the photosensitive film or resist. The recorded pattern may then be used to form a pattern in an underlying material using well known photolithography techniques.

A variety of shapes and sizes of the moth-eye elements 16 may be formed, including relatively blunt pillar-shaped elements 16a, shown in FIG. 6, and the conical elements 16 shown in FIG. 5. These structures have low reflectance over large wavelength bands and angular acceptance ranges. The moth-eye like structures can be patterned from sheets of holographic film, such as DuPont holographic film, for mass production.

The pattern of elements 16 may form a hologram, in one embodiment of the invention, which provides the diffusion normally handled by a separate diffuser as well as the effects normally provided by a separate lenticular array. A diffuser expands the viewing area in the vertical direction and the lenticular array stretches the viewing area along the horizontal dimensions. By encoding suitable holographic object and reference waves in a holographic medium, using the elements 16 or its substrate, the holographic phase plate 14 may replace both the diffuser and lenticular array used in prior structures while providing improved anti-reflection characteristics.

At the same time, the moth-eye like elements 16 may have relatively small feature sizes. For example in one embodiment of the invention, those feature sizes can be on the order of 100 nanometers. This means that there will be numerous scattering centers over a small region. The diffusion effects spatially average over local areas. Due to the spatial averaging, speckle reduction may be achieved in some embodiments of the present invention.

The plate 14 does not adversely effect the outgoing image light. In effect it acts as a one way valve allowing the image light to pass through substantially unaffected while rejecting (and in some cases effectively eliminating) inbound ambient light, thereby reducing glare.

A display screen may be formed of a support structure and a moth-eye pattern of light absorbing elements. The light absorbing elements improve the appearance of the image light outbound of the display while reducing the reflected light from the display which is viewed by the user as glare. The screen may be used in both projection displays and direct view displays and may be formed in a way that the moth-eye structures provide a holographic diffusing and lenticular array effect.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A direct view display comprising:
   a spatial light modulator; and
   a display screen comprising a support structure and a holographic phase plate including a pattern of light absorbing elements formed on said structure, said phase plate being defined in the pattern of light absorbing elements, said phase plate to expand the viewing area along the vertical direction and horizontal direction.

2. The display of claim 1 wherein said protrusions are conically shaped.

3. The display of claim 1 wherein said protrusions are pillar shaped.

4. The display of claim 1 wherein said protrusions are light transmissive.

5. The display of claim 1 wherein said protrusions have a feature size on the order of 100 nanometers.

6. The display of claim 5 wherein said screen is light transmissive.

7. A projection display comprising:

a spatial light modulator; and a display screen including a support structure and a holographic phase plate including a pattern of light absorbing elements formed on said structure, said phase plate being defined in the pattern of light absorbing elements, said phase plate to expand the viewing area along the vertical direction and horizontal direction.

8. The display of claim 7 wherein said protrusions are conically shaped.

9. The display of claim 7 wherein said protrusions are pillar shaped.

10. The display of claim 7 wherein said protrusions are light transmissive.

* * * * *